US012278891B2

(12) United States Patent
Van Kempen et al.

(10) Patent No.: US 12,278,891 B2
(45) Date of Patent: Apr. 15, 2025

(54) SINGLE-SERVER SECURE AGGREGATION WITH PUBLIC RANDOMNESS

(71) Applicant: NEC Laboratories Europe GmbH, Heidelberg (DE)

(72) Inventors: Elina Van Kempen, Heidelberg (DE); Giorgia Marson, Heidelberg (DE); Claudio Soriente, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 329 days.

(21) Appl. No.: 18/145,040

(22) Filed: Dec. 22, 2022

(65) Prior Publication Data

US 2024/0163082 A1 May 16, 2024

Related U.S. Application Data

(60) Provisional application No. 63/422,034, filed on Nov. 3, 2022.

(51) Int. Cl.
*G06F 21/00* (2013.01)
*H04L 9/08* (2006.01)

(52) U.S. Cl.
CPC ............ *H04L 9/0825* (2013.01); *H04L 9/085* (2013.01); *H04L 9/0861* (2013.01)

(58) Field of Classification Search
CPC ...... H04L 9/0825; H04L 9/085; H04L 9/0861
See application file for complete search history.

(56) References Cited

U.S. PATENT DOCUMENTS

| 2018/0034634 | A1* | 2/2018 | Benarroch Guenun ..................... H04L 9/3073 |
| 2019/0205568 | A1* | 7/2019 | Veugen .................... H04L 9/008 |
| 2022/0374544 | A1* | 11/2022 | Polychroniadou .......................... G06F 21/6245 |
| 2022/0374762 | A1* | 11/2022 | Radhakrishnan .. F02M 63/0064 |
| 2023/0120202 | A1* | 4/2023 | Yanai .................... H04L 9/3006 380/277 |
| 2024/0144029 | A1* | 5/2024 | Feng ...................... G06N 3/045 |
| 2024/0289638 | A1* | 8/2024 | Avestimehr ............ G06N 3/098 |

OTHER PUBLICATIONS

Bell, James et al.; "Secure Single-Server Aggregation with (Poly)Logarithmic Overhead"; *CCS 2020: Proceedings of the 2020 ACM SIGSAC Conference on Computer and Communications Security*; Nov. 2, 2020; pp. 1253-1269; ACM Publications; New York, NY, USA.

(Continued)

*Primary Examiner* — William A Corum, Jr.
(74) *Attorney, Agent, or Firm* — Leydig, Voit & Mayer, Ltd.

(57) ABSTRACT

A method for secure aggregation using public randomness is provided. The method includes determining, based on the public randomness from a random service beacon, a set of super-clients from a plurality of clients. The method further includes obtaining masked inputs from the clients and aggregated random values based on the set of super-clients. Each of the masked inputs is associated with a client from the plurality of clients and each of the aggregated random values is associated with a super-client from the set of super-clients. The method also includes aggregating the masked inputs from the plurality of clients and the aggregated random values from the set of super-clients.

14 Claims, 3 Drawing Sheets

(56) References Cited

OTHER PUBLICATIONS

Cortier, Véronique et al.; "Distributed ElGamal à la Pedersen—Application to Helios"; *Proceedings of the ACM Conference on Computer and Communications Security*; Nov. 4, 2013; pp. 131-142; ACM Publications; New York, NY, USA.

Ambrona, Miguel et al.; "Controlled Functional Encryption Revisited: Multi-Authority Extensions and Efficient Schemes for Quadratic Functions"; *Proceedings on Privacy Enhancing Technologies*; Jan. 2021; pp. 21-42; vol. 1; Sciendo; Warsaw, Poland.

\* cited by examiner

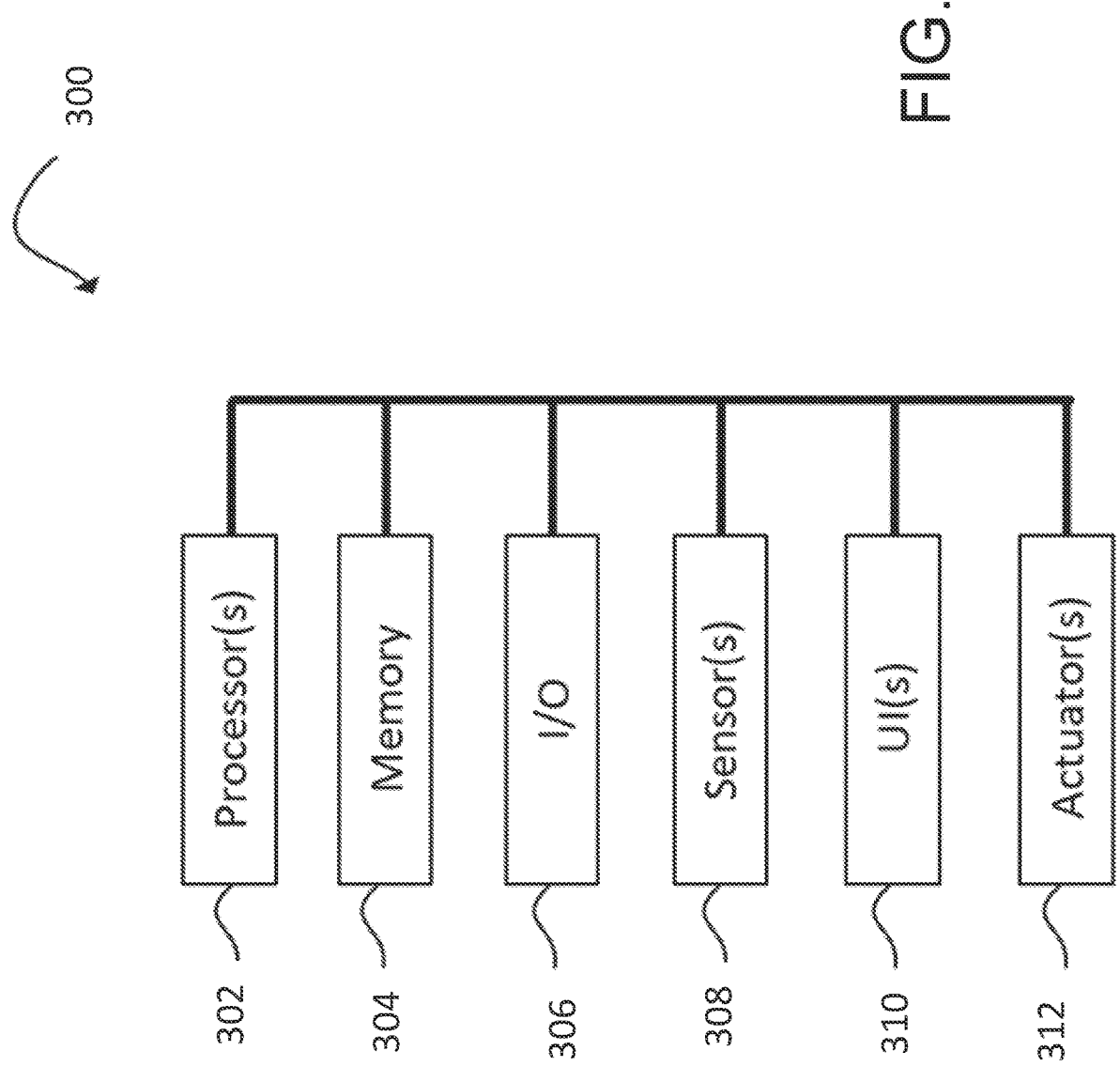

SINGLE-SERVER SECURE AGGREGATION WITH PUBLIC RANDOMNESS

CROSS-REFERENCE TO PRIOR APPLICATION

Priority is claimed to U.S. Provisional Application No. 63/422,034, filed on Nov. 3, 2022, the entire contents of which is hereby incorporated by reference herein.

FIELD

The present invention relates to a method, system and computer-readable medium for aggregation of inputs by a server.

BACKGROUND

Aggregation is used in a number of technical applications in which a server is specially programmed to compute statistics (e.g., sum and standard deviation) over client inputs. For example, in federated learning applications in the field of machine learning, a server is programmed to compute the average gradient of all gradients provided by clients in order to collaboratively train a machine-learning model. By doing so, however, the server learns individual client inputs. If the application manages sensitive data (e.g., health-related data in a federated learning application for electronic health (e-health)), then clients may not be willing to disclose their individual inputs to the server. Another technical application example is smart metering in the field of energy distribution in which a server is programmed to compute an aggregated energy consumption of a geographic area. By doing so, however, the server learns the individual consumption of clients (e.g., households).

Secure aggregation protocols allow the server to learn the sum of the inputs provided by clients (e.g., aggregate energy consumption of the households or health-related data in a federated learning application for e-health), but keeps individual client inputs private. James Henry Bell, Kallista A. Bonawitz, Adrià Gascón, Tancrède Lepoint, Mariana Raykova, "Secure Single-Server Aggregation with (Poly) Logarithmic Overhead," CCS 2020: Proceedings of the 2020 ACM SIGSAC Conference on Computer and Communications Security, pp. 1253-1269 (Nov. 2, 2020), which is hereby incorporated by reference herein, describe the state-of-the-art aggregation protocol. In this protocol, clients are denoted as $c_1, \ldots c_n$ and are randomly assigned to subsets called "neighborhoods". Client $c_i$, assigned to neighborhood $N_i$ and with private input $x_i$, masks its input as: $y_i = x_i + r_i + \Sigma_{j<i, j \in N_i} m_{ij} - \Sigma_{j>i, j \in N_i} m_{ij}$. In this equation, $y_i$ represents the masked input, $x_i$ represents the private input, $r_i$ represents a value drawn uniformly at random by the client $c_i$, i indicates the client between $c_1, \ldots c_n$, $m_{ij}$ indicates randomness computed as a pseudo-random function, which is described below, j indicates another client from $c_1, \ldots c_n$, and $N_i$ indicates a neighborhood (e.g., a random subset of nodes).

Following the masking, client $c_i$ sends the masked input, $y_i$, to the server. $m_{ij}$ is randomness computed as $F(s_{ij})$, where F is a pseudo-random function and $s_{ij}$ is shared randomness between client $c_i$ and client $c_j$. For example, $s_{ij}$ can be computed via a key agreement protocol where client $c_i$ (resp. client $c_j$) inputs its key pair secret key ($sk_i$) and private key ($pk_i$), (resp. $sk_j$, $pk_j$). $r_i$ is a value drawn uniformly at random by client $c_i$.

In some examples, a client can have an input vector $x = x[1] \ldots x[m]$. In this case, each dimension of the input vector (e.g., $x[w]$, which represents a dimension from x) is masked independently of the others. Next, each client $c_i$ secret-shares, e.g., by using Shamir secret-sharing, its secret key $sk_i$ and its random value $r_i$. Shares are distributed by client $c_i$ to the peers in its neighborhood $N_i$. By summing the received client inputs, the server obtains a masked version of the sum—due to the mask component $r_i + \Sigma_{j<i, j \in N_i} m_{ij} - \Sigma_{j>i, j \in N_i} m_{ij}$ added to its input $x_i$ by client $c_i$, which is indicated in the equation above. To remove the mask added by client $c_i$, the server can ask (e.g., provide a request to) $c_i$'s neighbors to provide either shares of $sk_i$ or shares of $r_i$.

SUMMARY

In an embodiment, the present disclosure provides a method for secure aggregation using public randomness, the method comprising: determining, by a server and based on the public randomness from a random service beacon, a set of super-clients from a plurality of clients; obtaining, by the server and from the plurality of clients, a plurality of masked inputs, wherein each of the plurality of masked inputs is associated with a client from the plurality of clients; obtaining, by the server and based on the set of super-clients, a plurality of aggregated random values, wherein each of the plurality of aggregated random values is associated with a super-client from the set of super-clients; and aggregating the plurality of masked inputs from the plurality of clients and the plurality of aggregated random values from the set of super-clients.

BRIEF DESCRIPTION OF THE DRAWING

Subject matter of the present disclosure will be described in even greater detail below based on the exemplary figure. All features described and/or illustrated herein can be used alone or combined in different combinations. The features and advantages of various embodiments will become apparent by reading the following detailed description with reference to the attached drawing, which illustrates the following:

FIG. 3 illustrates a simplified block diagram depicting an exemplary computing environment according to an embodiment of the present disclosure.

DETAILED DESCRIPTION

Figure 1:
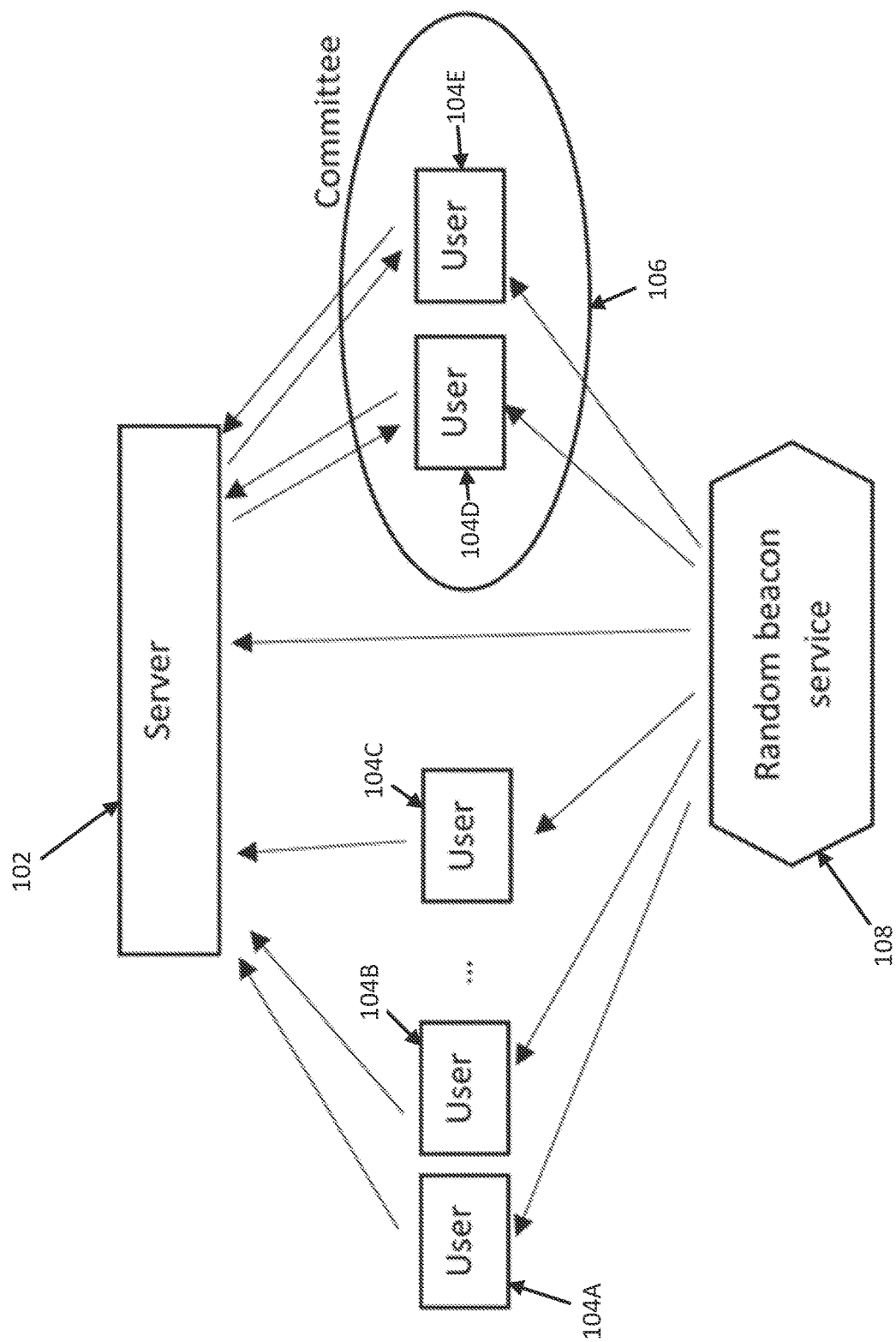
FIG. 1 illustrates a system for secure aggregation with public randomness according to an embodiment of the present invention.

Secure aggregation is used for a server to compute, calculate, obtain, and/or otherwise determine information (e.g., the sum and/or other measures of client-provided inputs) without revealing individual client inputs to any party. For example, secure aggregation protocols can be used for privacy-preserving federated learning applications.

According to the state-of-the-art aggregation protocol, the client communication overhead is O(log n+m), where n is the number of clients, m is the length of the input vector, and O is the big O mathematical notation. Furthermore, the state-of-the-art aggregation protocol goes through multiple rounds and it requires most of the clients to be online throughout the whole protocol execution. The state-of-the-art aggregation protocol is therefore not suitable for technical applications in which, for example, the clients are mobile phones with erratic online behavior.

Embodiments of the present invention enhance and improve secure aggregation using a random beacon service (e.g., a system that provides randomness beacons). A random beacon service can be and/or include a system (e.g., a computing system, device and/or platform) that provides randomness beacons (e.g., cryptographic beacons), which transmit a public source of randomness to entities. For instance, the random beacon service can provide new random data (e.g., a beacon record) at a rate (e.g., a regular rate). And, the random beacon service is a public source of randomness as entities agree that there is not a way to predict the next output from the beacon, and thus it can be a provider of fair random values.

In operation, embodiments of the present invention can use randomness to select a subset of clients that aid the server to aggregate inputs. In applications with a large numbers of clients, the resulting secure aggregation protocol exhibits lower communication overhead compared to the state-of-the-art aggregation protocol, both in terms of average number of messages per client and overall number of messages. This advantageously provides to save computational power, computation time and/or computational resources to perform the aggregations, while also decreasing the load on the computer network by decreasing the number of messages being communicated across the network.

Embodiments of the present invention use a random beacon service to achieve a secure aggregation protocol with lower communication overhead relative to the state-of-the-art aggregation protocol. Random beacons can be provided by a trusted third party. Additionally, and/or alternatively, randomness (e.g., random beacons) can be drawn from blockchain protocols, e.g., by using the hash of the latest block of a blockchain.

In embodiments of the present invention, the randomness provided by the random beacon service is used to select a subset of the clients (also referred to in the following as "super-clients") that aid the server in computing the aggregation of inputs provided by the clients. This is achieved via secret-sharing (e.g., blinding) and/or by means of homomorphic encryption.

In some instances, embodiments of the present invention can use secret-sharing. For instance, the client $c_i$ with private input $x_i$ sends to the server $y_i = x_i + r_i$, where $r_i$ is a value drawn uniformly at random by client $c_i$, $x_i$ is the private input, and $y_i$ is the masked input. Client $c_i$ also secret-shares $r_i$ and distributes shares across committee members. Thus, each committee member aggregates all shares received by clients and provides the result to the server. The server obtains masked information (e.g., a masked sum that is determined by summing all the masked inputs received by the clients). The mask is removed by adding the aggregated shares received by the committee members. This will be described in further detail below.

In some examples, embodiments of the present invention can use homomorphic encryption. For instance, a public key PK for the set of super-clients is provided such that each super-client member holds a share of the corresponding decryption key. For example, the encryption schemes described by Véronique Cortier, David Galindo, Stéphane Glondu, Malika Izabachène, "Distributed ElGamal à la Pedersen: Application to Helios," Proceedings of the ACM Conference on Computer and Communications Security, pp. 131-142, DOI 10.1145/2517840.2517852 (November 2013) or Miguel Ambrona, Dario Fiore, Claudio Soriente, "Controlled Functional Encryption Revisited: Multi-Authority Extensions and Efficient Schemes for Quadratic Functions," Proceedings on Privacy Enhancing Technologies, pp. 21-42, DOI 10.2478/popets-2021-0003 (January 2021), each of which is hereby incorporated by reference herein, can be used. Thus, client $c_i$ with input $x_i$, encrypts its input under PK and sends it to the server. The server homomorphically adds all ciphertexts received by clients and shares the resulting ciphertext—encrypting the sum of all client's inputs—with the set of super-clients. Super-clients use their shares of the decryption key to decrypt the ciphertext and send the result to the server. This will be described in further detail below.

In some embodiments of the present invention (e.g., the embodiments using secret-sharing and/or homomorphic encryption), the super-clients can share their secret key with a subset of randomly chosen peers, also referred to as "backup neighbors." In case one of the super-clients does not respond to the server, the server can ask the backup neighbors of the non-responding super-client to reconstruct its secret key. Once the secret key of the non-responding super-client is available, the server can compute the reply that the non-responding super-client was expected to provide, and complete the aggregation protocol.

In contrast to the state-of-the-art aggregation protocol, the client communication overhead for some embodiments of the present invention (e.g., the embodiments using secret-sharing and/or homomorphic encryption) is $O(m)$. Further, embodiments of the present invention (e.g., the embodiments using secret-sharing and/or homomorphic encryption) can perform the aggregation protocol even if only a small number of clients remain online (e.g., kl clients where k is the size of the set of super-clients, l is the number of backup neighbors per super-client, and kl<<n). For instance, a vast majority of clients may send one message and go offline, but if a small number of clients remain online, then the server can perform the aggregation protocol using embodiments of the present invention. The small number of clients that remain online can be the size of the set of super-clients, k, multiplied by the number of backup neighbors per super-client, l, and this small number is significantly less (e.g., <<) than the total number of clients, n.

In an embodiment, the present invention provides a method for secure aggregation using public randomness, the method comprising: determining, by a server and based on the public randomness from a random service beacon, a set of super-clients from a plurality of clients; obtaining, by the server and from the plurality of clients, a plurality of masked inputs, wherein each of the plurality of masked inputs is associated with a client from the plurality of clients; obtaining, by the server and based on the set of super-clients, a plurality of aggregated random values, wherein each of the plurality of aggregated random values is associated with a super-client from the set of super-clients; and aggregating the plurality of masked inputs from the plurality of clients and the plurality of aggregated random values from the set of super-clients.

In an embodiment, the plurality of masked inputs indicate a plurality of local machine-learning models that are trained by the plurality of clients, and wherein aggregating the plurality of masked inputs comprises aggregating the plurality of local machine-learning models to determine an updated global machine-learning model.

In an embodiment, the plurality of masked inputs indicate energy consumption of a set of households associated with the plurality of clients, and wherein aggregating the plurality of masked inputs comprises aggregating the energy consumption of the set of households to determine the overall energy consumption.

In an embodiment, the method further comprises: obtaining, by the server and from the random service beacon, the public randomness, wherein the public randomness is a random seed, and wherein determining the set of super-clients is based on using a pseudo-random function (PRF) and the random seed.

In an embodiment, the method further comprises: obtaining, by the server, a plurality of public keys from the plurality of clients; and determining a protocol parameter for the PRF, wherein determining the set of super-clients is further based on the plurality of public keys and the protocol parameter.

In an embodiment, obtaining the plurality of aggregated random values comprises obtaining an aggregated random value from each of the plurality of super-clients, wherein the aggregated random value is aggregated from random values received by the super-client from other clients of the plurality of clients, and wherein the random values are used to generate the plurality of masked inputs based on masking a plurality of private inputs.

In an embodiment, the method further comprises: determining a plurality of backup neighbors for the set of super-clients based on the random seed, a pseudo-random generator (PRG), and a plurality of public keys from the plurality of clients, wherein each of the set of super-clients is associated with a set of backup neighbors, of the plurality of backup neighbors.

In an embodiment, the method further comprises: determining one or more first super-clients, from the set of super-clients, that provided the plurality of aggregated random values and one or more second super-clients that did not provide aggregated random values; and comparing a number of the one or more first super-clients with a threshold.

In an embodiment, the method further comprises: based on the number being less than the threshold, providing, by the server, a list indicating the one or more second super-clients to the plurality of backup neighbors; based on providing the list, obtaining, by the server and from one or more sets of backup neighbors associated with the one or more second super-clients, shares of secret keys associated with the one or more second super-clients; reconstructing, by the server, the secret keys of the one or more second super-clients based on the shares of the secret keys; and decrypting, by the server, blinding seeds sent to the one or more second super-clients to obtain a plurality of second aggregated random values for the one or more second super-clients.

In an embodiment, the method further comprises: based on the number being at least the threshold, determining, by the server, a sum of blindings; and outputting the aggregated masked inputs.

In an embodiment, the plurality of masked inputs from the plurality of clients is based on one or more public keys associated with one or more of the set of super-clients, and wherein the method further comprises: aggregating the plurality of masked inputs to determine an aggregated masked input; providing the aggregated masked input to the set of super-clients, and wherein obtaining, by the server and based on the set of super-clients, the plurality of aggregated random values comprises obtaining, from one or more first super-clients of the set of super-clients, one or more first partially decrypted masked inputs, wherein the one or more first partially decrypted masked inputs are generated based on partially decrypting the aggregated masked input using one or more decryption keys associated with the one or more first super-clients.

In an embodiment, the method further comprises: based on a number of the one or more first super-clients being less than a threshold, providing, by the server, a list indicating one or more second super-clients, of the set of super-clients, to the plurality of backup neighbors, wherein the one or more second super-clients are super-clients that did not provide the one or more partially decrypted masked inputs; based on providing the list, obtaining, by the server and from one or more sets of backup neighbors associated with the one or more second super-clients, shares of secret keys associated with the one or more second super-clients; reconstructing, by the server, the secret keys of the one or more second super-clients based on the shares of the secret keys; and decrypting, by the server, one or more second partially decrypted masked inputs using the secret keys of the one or more second super-clients.

In an embodiment, the method further comprises: based on the number being at least the threshold, determining, by the server, the decrypted masked inputs, and wherein aggregating the plurality of masked inputs from the plurality of clients comprises aggregating the decrypted masked inputs.

In another embodiment, a system comprising one or more hardware processors which, alone or in combination, are configured to execute the method for secure aggregation using public randomness according to any embodiment of the present invention is provided.

In a further embodiment, a tangible, non-transitory computer-readable medium having instructions thereon which, upon being executed by one or more processors, alone or in combination, provide for execution of a method according to any embodiment of the present invention.

Embodiments of the present invention provide a method, system and computer-readable medium for secure aggregation, which allow a server to compute the aggregation of the inputs of n clients while keeping the individual inputs from the clients private. For example, embodiments of the present invention can be used in federated learning applications in the field of machine learning. For instance, a server can own an initial global machine-learning model and distributes it to clients (e.g., client devices). Clients train the global machine-learning model with their local data-sets and obtain a local machine-learning model. Each client sends the local machine-learning model to the server that is programmed to aggregate all models received to obtain an updated global machine-learning model. Using the secure aggregation protocol according to embodiments of the present invention, the server can compute the updated global machine-learning model without learning (e.g., obtaining or determining) the local machine-learning models of individual clients. As another example of a technical application, embodiments of the present invention can be used in a smart metering application in the field of energy distribution. For instance, a server is programmed to compute the overall energy consumption of a set of households that act as clients. Each client (e.g., a client device at each of the households) sends its individual energy consumption, and the server aggregates the received information (e.g., all of the individual energy consumptions) to obtain the overall energy consumption. By means of the secure aggregation protocol according to embodiments of the present invention, the server can compute the overall energy consumption without learning (e.g., obtaining or determining) individual client energy consumption.

FIG. 1 illustrates a system for secure aggregation with public randomness according to an embodiment of the present invention. For example, FIG. 1 includes a server 102, users 104A-104E (e.g., clients such as client devices), and a random beacon service 108. The users 104A-104E can include any number of users such as clients and/or client devices. For instance, in-between users 104B and 104C can include one or more additional users. Further, certain users (e.g., users 104D and 104E) are part of a committee 106. The committee 106 can indicate a set of super-clients.

Referring to FIG. 1, the system 100 shows the entities involved in the secure aggregation protocols with public randomness. Embodiments of the present invention use a random beacon service 108 to generate uniform randomness for selecting the super-clients from users 104A-104E. In some instances, the backup neighbors of super-clients can be generated using the uniform randomness from the random beacon service 108 as well. For example, according to some embodiments, a server 102 determines (e.g., chooses) a set of super-clients from the users 104A-104E based on evaluating a pseudo-random function (PRF) on input a random seed, generated by the random beacon service 108, and the public keys of all the clients (e.g., the users 104A-104E). Similarly, each super-client is assigned a pseudo-randomly chosen set of backup neighbors. For instance, user 104A can be a super-client with one or more backup neighbors (e.g., other users such as user 104B and/or 104C).

Super-clients and backup neighbors aid the server 102 in computing the aggregation of clients' inputs (e.g., inputs from the users 104A-104E) throughout the protocol execution, while the rest of the clients only have to be active once to provide their inputs to the server 102. At a high level, each client (e.g., each user from the users 104A-104E) provides a masked input to the server 102 and each super-client provides a partial output to the server 102. The server 102 can use these partial outputs to remove the masks (e.g., the masks of the masked inputs) and recover the sum of clients' inputs. This method guarantees that the inputs of each client remain private, in the sense that neither the server 102 nor any other client can learn individual inputs (e.g., which input belongs to which user 104A-104E). Moreover, should some of the committee members drop out before being able to send their partial outputs to the server 102, their backup neighbors allow the server 102 to reconstruct the missing partial outputs and complete the protocol.

Although certain entities within system 100 are described herein in the FIGs. as being singular entities, it will be appreciated that the entities and functionalities discussed herein can be implemented by and/or include one or more entities (e.g., one or more servers). The entities within the system 100 are in communication with other devices and/or systems within the system 100 via a network. The network can be a global area network (GAN) such as the Internet, a wide area network (WAN), a local area network (LAN), or any other type of network or combination of networks. The network can provide a wireline, wireless, or a combination of wireline and wireless communication between the entities within the system 100.

The users 104A-104E (e.g., clients such as client devices and/or user devices) as well as other users in-between user 104B and 104C are computing devices that are operated by a client, customer, and/or other individual that is associated with the server 102. Each user from system 100 is and/or includes, but is not limited to, a desktop, laptop, tablet, mobile device (e.g., smartphone device, or other mobile device), computing system and/or other types of computing entities that generally comprises one or more communication components, one or more processing components, and one or more memory components.

The server 102 is a computing system that performs one or more functions described herein. For instance, the server 102 can include, execute, operate, and/or otherwise be configured to perform secure aggregation using public randomness. For instance, in operation, the server 102 obtains information (e.g., public randomness such as a seed) from the random beacon service and/or information from the users 104A-104E (e.g., public keys). The server 102 determines super-clients and/or backup neighbors from the users 104A-104E based on the information from the random beacon service and/or the information from the users 104A-104E. Subsequently, based on determining the super-clients and/or backup neighbors, the server 102 performs secure aggregation. For instance, the super-clients and/or the back-up neighbors assist the server 102 in computing the aggregation of the inputs from the users 104A-104E as well as additional users within the system 100. For example, the super-clients are a subset of the users from system 100 that aid the server 102 in computing the aggregation of the inputs provided by the users of the system 100. Each super-client includes one or more back-up neighbors. The back-up neighbors allow the server 102 to reconstruct missing partial outputs and complete the aggregation protocol if some committee members drop out before being able to send their partial outputs to the server 102. This will be explained in further detail below.

The server 102 includes and/or is implemented using one or more computing devices, computing platforms, cloud computing platforms, systems, servers, and/or other apparatuses. In some instances, the server 102 can be implemented as engines, software functions, and/or applications. For example, the functionalities of the server 102 can be implemented as software instructions stored in storage (e.g., memory) and executed by one or more processors.

The random beacon service 108 is a computing system that performs one or more functions described herein. For instance, the random beacon service 108 can provide public randomness (e.g., a seed for a PRF) to the server 102 and/or the users within the system 100. The random beacon service 108 includes and/or is implemented using one or more computing devices, computing platforms, cloud computing platforms, systems, servers, and/or other apparatuses. The random beacon service 108 may be a third party entity (e.g., an entity that is not associated with the server 102 and/or the users of the system 100). In some instances, the random beacon service 108 can be implemented as engines, software functions, and/or applications. For example, the functionalities of the random beacon service 108 can be implemented as software instructions stored in storage (e.g., memory) and executed by one or more processors.

In the following, several embodiments of the present invention using the secure aggregation protocols with public randomness are discussed. For instance, in some embodiments, blinding (e.g., secret-sharing) is used. In other embodiments, homomorphic encryption is used. In some variations, the secure aggregation protocols can take several rounds and clients can go offline at any time.

In an embodiment of the present invention using blinding, a random beacon service 108 is provided that broadcasts unbiased random seeds either on demand or at pre-defined time intervals. A Public Key Infrastructure (PKI) is also provided that distributes authentic public keys of clients (e.g., the users of system 100) and/or the server 102.

Let $U_1 = \{c_1, \ldots c_n\}$ denote the initial set of clients and let $|U_1| = n$. For example, $U_1$ denotes the clients such as all of the users of system 100. The magnitude of $U_1$ (e.g., $|U_1|$) or the total number of clients in system 100 is denoted by n.

In a first step, the server 102 obtains the public keys of all clients from the PKI and receives the random seed Q from the random beacon service 108. For instance, the server 102 obtains the public keys from the users (e.g., users 104A-104E) of system 100 and public randomness (e.g., the random seed Q) from the random beacon service 108. The server 102 computes the set of super-clients $\mathcal{K} \leftarrow \{i:F(Q; pk_i) < \tau\}$ by evaluating a Pseudo-random Function (PRF) F keyed with the random seed Q, where $\tau$ is a protocol parameter. For example, the server 102 determines (e.g., calculates, computes, and/or obtains) a set of super-clients, $\mathcal{K}$, based on a PRF, F. For instance, the server 102 inputs (e.g., keys) a random seed, Q, with the public keys, $pk_i$, from the clients into the PRF to determine the set of super-clients. Furthermore, the server 102 uses a protocol parameter, $\tau$, to determine the set of super-clients.

For example, if the range of F is [0,1] (e.g., the output from the PRF is between 0 and 1), the server 102 can set $\tau$ to 0.1 so to have clients be appointed super-client with 0.1 probability. For instance, if there are 100 total users (e.g., clients) in the system 100 and the protocol parameter is 0.1, then the server 102 may determine 10 clients as super-clients.

For each super-client $i \in \mathcal{K}$ (e.g., each super-client i that is an element of the total set of super-clients $\mathcal{K}$), the server 102 can also compute the list of backup neighbors $\mathcal{L}_i = \{G_B(Q, pk_i, j)\}_{1 \leq j \leq l}$ using a Pseudo-random Generator (PRG) $G_B$ and encoding the PRG output as a list of l clients. The PRG range is [n], which is the set itself (e.g., the set $\{1, 2, \ldots, n-1, n\}$). For instance, the server 102 determines the list of backup neighbors, $\mathcal{L}_i$, using a PRG, $G_B$. For example, the server 102 inputs the random seed Q, the public keys, $pk_i$, and j. As used herein, "I" and "j" refer to users (e.g., the users 104A-104E), which can include a regular user, a super-client, and/or a back-up neighbor. Further, as used herein, it should be understood that the user "I" and/or the user "j" might not refer to the same user from a preceding section and/or embodiment (e.g., the user "I" may refer to multiple different users in different sections such as a super-client in one section and a backup neighbor in another). In most embodiments, the first user may be designated "I" and additional users may be designated "j". In other embodiments, this may be reversed.

In a second step, the super-clients obtain the public keys of every user from the PKI. For instance, the server 102 can provide an indication to the users of the system 100 that have been determined as super-clients. Then, the super-clients can request and obtain the public keys from the users of the system 100. Further, each super-client i from the entire list of super-clients, $\mathcal{K}$, determines (e.g., computes and/or obtains) the list of its backup neighbors $\mathcal{L}_i$. For example, both the server 102 and the super-clients may become aware of the list of backups for that super-user by determining the list of its backup neighbors. In some instances, the server 102 computes this list and sends it to the super-client. In other instances, the server 102 and the super-client compute this list individually. The list can be determined by randomness Q, and both parties can end up with the same list in both instances. Each super-client i secret-shares its secret key $sk_i$ in a $t_s$ out of l scheme, creating shares $$\{sk_{ij}\}_{j \in \mathcal{L}_i},$$

where $l = |\mathcal{L}_i|$ and $t_s$ is a tunable parameter determining the number of shares required to reconstruct $sk_i$. For instance, the shares may be determined using a Shamir secret-sharing. For example, the entity (e.g., the super-client) computing the shares of the secret S may draw a random polynomial (e.g., "f(x)") of degree t−1 such that f(0)=S. Next, the same party computes the i-th share as f(i). Given t or more shares (e.g., t is the tunable parameter), f(0) can be recovered, that is the secret S, via interpolation. In operation, each super-client i shares its secret key, $sk_i$, with its backup neighbors. For example, for five total back-up neighbors (e.g., l is five from the list of backup neighbors $\mathcal{L}_i$), the super-client can determine that three (e.g., $t_s$ is three) can be used to reconstruct the super-client's secret key. The super-client can provide shares of its key to the back-up neighbors such that only three of them are needed to reconstruct the secret key $sk_{ij}$.

For instance, for each backup neighbor j, the super-client i encrypts share $sk_{ij}$ under the public key of backup neighbor j and sends the ciphertext to backup neighbor j. For example, using the public key of the backup neighbor, the super-client encrypts its secret key $sk_{ij}$, and provides the encrypted secret key (e.g., ciphertext) to the backup neighbor.

In a third step, each client i generates k masking seeds $\{b_{ij}\}_{j \in \mathcal{K}}$, one for each super-client $j \in \mathcal{K}$. The masking seeds may be drawn randomly (e.g., the masking seeds may be a random value in the domain of function G, which is a PRG). For instance, each client generates a number of masking seeds, where k represents the total number and $b_{ij}$ represents the masking seeds that are generated. Then, for each super-client j, client i encrypts seed $b_{ij}$ under the public key of super-client j and sends the ciphertext to super-client j. For instance, the client encrypts its masking seed for a particular super-client with the public key of the super-client, and provides the encrypted masking seed (e.g., ciphertext) to that super-client. Next, the client i computes $y_i = x_i + B_i$, where $B_i = \Sigma_{j \in \mathcal{K}} G(b_{ij})$ and G is a PRG, and sends it to the server. For example, the client may compute $B_i$, which is computed as the sum of the outputs of G evaluated at all $b_{ij}$. For instance, if the entity computing this sum is a first client and nodes 3, 7, 8 are super-clients (e.g., clients 3, 7, and 8 are super-clients), then node 1 (e.g., the first client) may draw three masking seeds: b_13, b_17, b_18. Hence, B_1=G(b_13)+G(b_17)+G(b_18). In some variations, the client determines the masked input $y_i$ based on the private input $x_i$ and randomly drawn information $B_i$. For instance, the client determines the randomly drawn information by using a summation function for each of the super-clients within the total set of super-clients and a PRG, G, with the generated masked seeds for each of the super-clients.

In a fourth step, which can be performed if the third step above is performed (e.g., based one or more of the clients dropping out that is described above), denote $U_2 \subseteq U_1$ as the set of clients that completed step three above. For instance, $U_2$ is a subset of $U_1$, which includes the total number of clients in system 100, and $U_2$ is the set of clients that completed the third step above. For this subset, the super-clients receive the masking seeds from these clients within the subset. Then, the super-client j computes $B_j^{sum} = \Sigma_{i \in U_2} G(b_{ij})$ and sends $B_j^{sum}$ to the server 102. $B_j^{sum}$ may be computed similarly to $B_i$, which is described above. $B_j^{sum}$ is the aggregated random value from the other clients (e.g., clients other than the super-client that computes the aggregated random value). Each super-client can send the aggregated random value to the server 102 such that the server obtains a plurality of aggregated random values.

Next, denote $\mathcal{K}_1 \subseteq \mathcal{K}$ as the set of super-clients that completed step four above. Let $r=|\mathcal{K}_1|$. For instance, $\mathcal{K}_1$ is a subset of the total super-clients $\mathcal{K}$ that completed step four above, and r is the number (e.g., amount) of the subset of super-clients.

In some examples, if r<k, then a fifth step is carried out. For instance, if the number from the subset of super-clients that completed step four is less than k, then a fifth step is carried out. "k" is the size of the set of super-clients, and is a tunable parameter. In a fifth step, the server 102 sends the list of dropout super-clients $\mathcal{K} \setminus \mathcal{K}_1$ to all neighbors of all super-clients $\{\mathcal{L}_i\}_{i \in \mathcal{K}}$. For instance, "\" represents the set difference formed by all of the super-clients that are not within the subset of super-clients $\mathcal{K}_1$. The server 102 sends the list of these super-clients that are not within the subset of super-clients above to the backup neighbors $\mathcal{L}_i$ for the super-clients. Each backup neighbor j of dropped super-client i decrypts and sends to the server their share of super-client i's secret key $sk_{ij}$. For each dropped super-client i, if the server 102 receives at least $t_s$ shares of the secret key, the server 102 reconstructs the secret key $sk_i$ of the dropped out super-client. The set of super-clients from which the secret key has been reconstructed can be denoted as $\mathcal{K}_{rec}$. Then, let $r_d=|\mathcal{K}_{rec}|$ (e.g., $r_d$ is the magnitude of $\mathcal{K}_{rec}$). The server 102 then decrypts and obtains the blinding seeds sent to dropped super-client i: $\{b_{ji}\}_{j \in U_2}$. The server gets (e.g., obtains) $B_i^{sum}$ for each super-clients $i \in \mathcal{K}_{rec}$.

In some instances, if r is at least k (e.g., r is greater than or equal to k) or $r+r_d$ is at least k (e.g., $r+r_d$ is greater than or equal to k), then a sixth step is carried out. In the sixth step, the server 102 determines (e.g., computes) the sum of blindings as $\Sigma_{i \in U_2} B_i = \Sigma_{j \in \mathcal{K}} B_j^{sum}$, and outputs $\Sigma_{i \in U_2} x_i = \Sigma_{i \in U_2} y_i - \Sigma_{i \in U_2} B_i$.

In some embodiments of the present invention, homomorphic encryption is used. For instance, compared to the embodiments using blinding, an additively homomorphic encryption scheme and a public key PK for the set of super-clients are provided such that each super-client holds a share of the corresponding decryption key. In these embodiments, the first two steps (e.g., steps one and two) described above with the use of blinding are the same and are not repeated for brevity.

At a third step, each client i encrypts its input $x_i$ under the super-clients public key PK and sends the ciphertext, denoted it as $y_i$, to the server 102. For instance, the server 102 obtains the ciphertext (e.g., the encrypted input) that is encrypted based on the clients private input $x_i$ and the super-clients public key PK.

Next, denote $U_2 \subseteq U_1$ as the set of clients that completed step three above. For instance, For instance, $U_2$ is a subset of $U_1$, which includes the total number of clients in system 100, and $U_2$ is the set of clients that completed the third step above. In step four, the server 102 aggregates all ciphertexts received from clients in $U_2$ as $y_{sum} = \Sigma_{i \in U_2} y_i$ and provides $y_{sum}$ to the super-clients. For instance, the server 102 determines, from the masked inputs from the clients $y_i$, an aggregation (e.g., by using a summation $\Sigma_{i \in U_2} y_i$ of the clients i within the set $U_2$) of the masked inputs, which is denoted by $y_{sum}$.

At step five, each super-client uses its share of the decryption key to partially decrypt $y_{sum}$ and sends the partially decrypted ciphertext to the server 102. The decryption key might not be public, but may be tied (e.g., associated with) the public key.

Following, denote $\mathcal{K}_1 \subseteq \mathcal{K}$ as the set of super-clients that completed step five above. Let $r=|\mathcal{K}_1|$. For instance, $\mathcal{K}_1$ is a subset of the total super-clients $\mathcal{K}$ that completed step five above, and r is the number (e.g., amount) of the subset of super-clients.

If r<k, then step six is performed. For instance, if the number from the subset of super-clients that completed step four is less than k, then a sixth step is carried out. For instance, step six, the server 102 sends the list of dropout super-clients $\mathcal{K} \setminus \mathcal{K}_1$ to all neighbors of all super-clients $\{\mathcal{L}_i\}_{i \in \mathcal{K}}$. For instance, \ represents the set difference formed by all of the super-clients that are not within the subset of super-clients $\mathcal{K}_1$. The server 102 sends the list of these super-clients that are not within the subset of super-clients above to the backup neighbors $\mathcal{L}_i$ for the super-clients. Each backup neighbor j of dropped super-client i decrypts and sends to the server 102 their share of super-client i's secret key $sk_{ij}$. For each dropped super-client i, if the server receives at least $t_s$ shares of the secret key, the server 102 reconstructs the secret key $sk_i$. The set of super-clients from which the secret key has been reconstructed can be denoted as $\mathcal{K}_{rec}$. Then, let $r_d=|\mathcal{K}_{rec}|$ (e.g., $r_d$ is the magnitude of $\mathcal{K}_{rec}$). The server can thus carry out the partial decryption of $y_{sum}$ (e.g., the aggregation of the masked inputs) on behalf of each super-client in $\mathcal{K}_{rec}$.

If $r+r_d=k$, then step seven is performed. In step seven, the server 102 can decrypt $y_{sum}$ and obtain $\Sigma_{i \in U_2} x_i$. For instance, $\Sigma_{i \in U_2} x_i$ is the sum of the individual inputs from all of the users.

Embodiments of the present invention provide for the following improvements and advantages over existing computer systems and computer networks specially adapted and programmed for aggregation:

1. Masking, by a client of a distributed application, a client input with a set of client-drawn random values and sending, by the client, the masked input to the server, and sending, by the client, each of the client-drawn random values to a set of selected super-clients, chosen by means of public randomness.
2. Adding, by each of the selected super-clients, the random values received from the other clients and sending the result to the server
3. Adding, by the server, the masked inputs received from clients and the sum of random values received from the selected super-clients so as to compute the sum of the client inputs.
4. Providing for low communication overhead in terms of total number of messages and in terms of average number of messages per client, thereby enabling to save computational power, computation time and/or computational resources to perform the aggregations, while also decreasing the load on the computer network.

In an embodiment, the present invention provides a method for single-server secure aggregation comprising the steps of:

1. Selecting, by means of public randomness, a set of super-clients.
2. Sending, by each client, random values to the set of selected super-clients of step 1 and using the random values to mask the client private input.
3. Sending, by each client, the masked input to the server.
4. Sending, by each selected super-client of step 1, the sum of the random values received by the other clients to the server. For instance, the super-client j may send a message to the server. For the blind use embodiment(s) described above, the message is $B_j^{sum}$.

For the homomorphic encryption embodiment(s), the message is a partially decrypted $y_{sum}$.

5. Adding, by the server, the masked inputs received by the clients and the aggregated random values received by the selected super-clients of step 1. For instance, note that $\Sigma_{i \in U_2} B_i = \Sigma_{j \in \mathcal{K}} B_j^{sum}$.

Hence, $\Sigma_{i \in U_2} y_i - \Sigma_{j \in \mathcal{K}} B_j^{sum} = \Sigma_{i \in U_2} x_i + \Sigma_{i \in U_2} B_i - \Sigma_{j \in \mathcal{K}} B_j^{sum} = \Sigma_{i \in U_2} x_i + \Sigma_{i \in U_2} B_i - \Sigma_{i \in U_2} B_i = \Sigma_{i \in U_2} x_i$.

For instance, each client may mask their input with one random value per super-client and share each of those random values with each of the super-clients. The sum of user inputs may thus include a random value per client per super-client. Each super-client adds the random values it gets from each client and sends it to the server. The sum of the random values (e.g., $B_j^{sum}$ and/or $y_{sum}$) at the server 102 is the sum of each random value per client per super-client. Hence, the two quantities cancel out and the server 102 determines (e.g., learns) the sum of the individual inputs.

Figure 2:
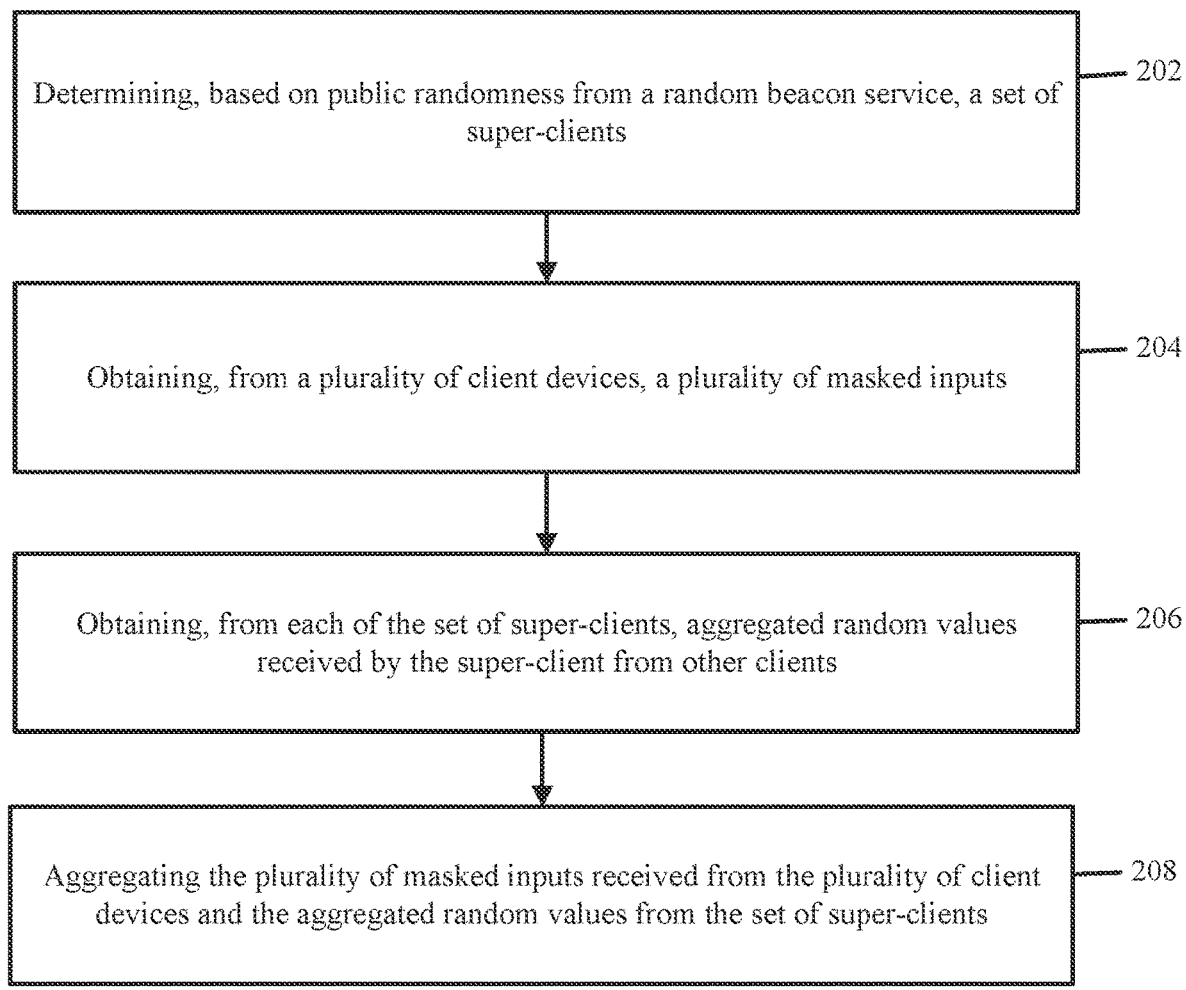
FIG. 2 illustrates a process for secure aggregation with public randomness according to an embodiment of the present disclosure.

FIG. 2 illustrates a process for privacy preservation according to an embodiment of the present disclosure. For instance, at block 202, a computing entity (e.g., the server 102) determines (e.g., selects), based on public randomness from a random beacon service, a set of super-clients.

At block 204, the computing entity obtains, from a plurality of client devices, a plurality of masked inputs. For instance, each client (e.g., each client device) can send random values to the set of super-clients determined at block 202. The random values are used to mask the client private input. Then, the clients can send the masked input also to the computing entity.

At block 206, the computing entity obtains, from each of the set of super-clients, aggregated random values received by the super-client from the other clients.

At block 208, the computing entity aggregates the plurality of masked inputs received from the plurality of client devices and the aggregated random values from the set of super-clients.

FIG. 3 illustrates an exemplary processing system according to an embodiment of the present disclosure. Referring to FIG. 3, a processing system 300 can include one or more processors 302, memory 304, one or more input/output devices 306, one or more sensors 308, one or more user interfaces 310, and one or more actuators 312. Processing system 300 can be representative of each computing system disclosed herein.

Processors 302 can include one or more distinct processors, each having one or more cores. Each of the distinct processors can have the same or different structure. Processors 302 can include one or more central processing units (CPUs), one or more graphics processing units (GPUs), circuitry (e.g., application specific integrated circuits (ASICs)), digital signal processors (DSPs), and the like. Processors 302 can be mounted to a common substrate or to multiple different substrates.

Processors 302 are configured to perform a certain function, method, or operation (e.g., are configured to provide for performance of a function, method, or operation) at least when one of the one or more of the distinct processors is capable of performing operations embodying the function, method, or operation. Processors 302 can perform operations embodying the function, method, or operation by, for example, executing code (e.g., interpreting scripts) stored on memory 304 and/or trafficking data through one or more ASICs. Processors 302, and thus processing system 300, can be configured to perform, automatically, any and all functions, methods, and operations disclosed herein. Therefore, processing system 300 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 300 can be configured to perform task "X". Processing system 300 is configured to perform a function, method, or operation at least when processors 302 are configured to do the same.

Memory 304 can include volatile memory, non-volatile memory, and any other medium capable of storing data. Each of the volatile memory, non-volatile memory, and any other type of memory can include multiple different memory devices, located at multiple distinct locations and each having a different structure. Memory 304 can include remotely hosted (e.g., cloud) storage.

Examples of memory 304 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 304.

Input-output devices 306 can include any component for trafficking data such as ports, antennas (i.e., transceivers), printed conductive paths, and the like. Input-output devices 806 can enable wired communication via USB®, DisplayPort®, HDMI®, Ethernet, and the like. Input-output devices 306 can enable electronic, optical, magnetic, and holographic, communication with suitable memory 304. Input-output devices 306 can enable wireless communication via WiFi®, Bluetooth®, cellular (e.g., LTE®, CDMA®, GSM®, WiMax®, NFC®), GPS, and the like. Input-output devices 306 can include wired and/or wireless communication pathways.

Sensors 308 can capture physical measurements of environment and report the same to processors 302. User interface 310 can include displays, physical buttons, speakers, microphones, keyboards, and the like. Actuators 312 can enable processors 302 to control mechanical forces.

Processing system 300 can be distributed. For example, some components of processing system 300 can reside in a remote hosted network service (e.g., a cloud computing environment) while other components of processing system 300 can reside in a local computing system. Processing system 300 can have a modular design where certain modules include a plurality of the features/functions shown in FIG. 3. For example, I/O modules can include volatile memory and one or more processors. As another example, individual processor modules can include read-only-memory and/or local caches.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for secure aggregation using public randomness, the method comprising:
    obtaining, by a server and from a random service beacon, the public randomness, wherein the public randomness is a random seed;
    determining, by the server, a set of super-clients from a plurality of clients based on using a pseudo-random function (PRF) and the random seed;
    obtaining, by the server and from the plurality of clients, a plurality of masked inputs, wherein each of the plurality of masked inputs is associated with a client from the plurality of clients;
    obtaining, by the server and based on the set of super-clients, a plurality of aggregated random values, wherein each of the plurality of aggregated random values is associated with a super-client from the set of super-clients; and
    aggregating the plurality of masked inputs from the plurality of clients and the plurality of aggregated random values from the set of super-clients.

2. The method of claim 1, wherein the plurality of masked inputs indicate a plurality of local machine-learning models that are trained by the plurality of clients, and wherein aggregating the plurality of masked inputs comprises aggregating the plurality of local machine-learning models to determine an updated global machine-learning model.

3. The method of claim 1, wherein the plurality of masked inputs indicate energy consumption of a set of households associated with the plurality of clients, and wherein aggregating the plurality of masked inputs comprises aggregating the energy consumption of the set of households to determine the overall energy consumption.

4. The method of claim 1, further comprising:
    obtaining, by the server, a plurality of public keys from the plurality of clients; and
    determining a protocol parameter for the PRF, wherein determining the set of super-clients is further based on the plurality of public keys and the protocol parameter.

5. The method of claim 1, wherein obtaining the plurality of aggregated random values comprises obtaining an aggregated random value from each of the plurality of super-clients, wherein the aggregated random value is aggregated from random values received by the super-client from other clients of the plurality of clients, and wherein the random values are used to generate the plurality of masked inputs based on masking a plurality of private inputs.

6. The method of claim 1, further comprising:
    determining a plurality of backup neighbors for the set of super-clients based on the random seed, a pseudo-random generator (PRG), and a plurality of public keys from the plurality of clients,
    wherein each of the set of super-clients is associated with a set of backup neighbors, of the plurality of backup neighbors.

7. The method of claim 6, further comprising:
    determining one or more first super-clients, from the set of super-clients, that provided the plurality of aggregated random values and one or more second super-clients that did not provide aggregated random values; and
    comparing a number of the one or more first super-clients with a threshold.

8. The method of claim 7, further comprising:
    based on the number being less than the threshold, providing, by the server, a list indicating the one or more second super-clients to the plurality of backup neighbors;
    based on providing the list, obtaining, by the server and from one or more sets of backup neighbors associated with the one or more second super-clients, shares of secret keys associated with the one or more second super-clients;
    reconstructing, by the server, the secret keys of the one or more second super-clients based on the shares of the secret keys; and
    decrypting, by the server, blinding seeds sent to the one or more second super-clients to obtain a plurality of second aggregated random values for the one or more second super-clients.

9. The method of claim 7, further comprising:
    based on the number being at least the threshold, determining, by the server, a sum of blindings; and
    outputting the aggregated masked inputs.

10. The method of claim 6, wherein the plurality of masked inputs from the plurality of clients is based on one or more public keys associated with one or more of the set of super-clients, and wherein the method further comprises:
    aggregating the plurality of masked inputs to determine an aggregated masked input;
    providing the aggregated masked input to the set of super-clients, and
    wherein obtaining, by the server and based on the set of super-clients, the plurality of aggregated random values comprises obtaining, from one or more first super-clients of the set of super-clients, one or more first partially decrypted masked inputs, wherein the one or more first partially decrypted masked inputs are generated based on partially decrypting the aggregated masked input using one or more decryption keys associated with the one or more first super-clients.

11. The method of claim 10, further comprising:
    based on a number of the one or more first super-clients being less than a threshold, providing, by the server, a list indicating one or more second super-clients, of the set of super-clients, to the plurality of backup neighbors, wherein the one or more second super-clients are super-clients that did not provide the one or more partially decrypted masked inputs;
    based on providing the list, obtaining, by the server and from one or more sets of backup neighbors associated with the one or more second super-clients, shares of secret keys associated with the one or more second super-clients;

reconstructing, by the server, the secret keys of the one or more second super-clients based on the shares of the secret keys; and decrypting, by the server, one or more second partially decrypted masked inputs using the secret keys of the one or more second super-clients.

12. The method of claim 11, further comprising:

based on the number being at least the threshold, determining, by the server, the decrypted masked inputs, and wherein aggregating the plurality of masked inputs from the plurality of clients comprises aggregating the decrypted masked inputs.

13. A system for secure aggregation using public randomness, the system comprising one or more hardware processors, which, alone or in combination, are configured to provide for execution of the following steps:

obtaining, by a server and from a random service beacon, the public randomness, wherein the public randomness is a random seed;

determining, by the server, a set of super-clients from a plurality of clients based on using a pseudo-random function (PRF) and the random seed;

obtaining, by the server and from the plurality of clients, a plurality of masked inputs, wherein each of the plurality of masked inputs is associated with a client from the plurality of clients;

obtaining, by the server and based on the set of super-clients, a plurality of aggregated random values, wherein each of the plurality of aggregated random values is associated with a super-client from the set of super-clients; and aggregating the plurality of masked inputs from the plurality of clients and the plurality of aggregated random values from the set of super-clients.

14. A tangible, non-transitory computer-readable medium having instructions thereon which, upon being executed by one or more processors, alone or in combination, provide for execution of a method for secure aggregation using public randomness comprising the following steps:

obtaining, by a server and from a random service beacon, the public randomness, wherein the public randomness is a random seed;

determining, by the server, a set of super-clients from a plurality of clients based on using a pseudo-random function (PRF) and the random seed;

obtaining, by the server and from the plurality of clients, a plurality of masked inputs, wherein each of the plurality of masked inputs is associated with a client from the plurality of clients;

obtaining, by the server and based on the set of super-clients, a plurality of aggregated random values, wherein each of the plurality of aggregated random values is associated with a super-client from the set of super-clients; and aggregating the plurality of masked inputs from the plurality of clients and the plurality of aggregated random values from the set of super-clients.

\* \* \* \* \*